United States Patent [19]

Trygg

[11] Patent Number: 4,486,045
[45] Date of Patent: Dec. 4, 1984

[54] BOTTLE-GRIPPING DEVICE

[76] Inventor: Lars E. Trygg, Villa Solvik 310, S-770 13 Grangärde, Sweden

[21] Appl. No.: 433,475
[22] PCT Filed: Feb. 11, 1982
[86] PCT No.: PCT/SE82/00044
 § 371 Date: Sep. 22, 1982
 § 102(e) Date: Sep. 22, 1982
[87] PCT Pub. No.: WO82/02871
 PCT Pub. Date: Sep. 2, 1982

[30] Foreign Application Priority Data

Feb. 20, 1981 [SE] Sweden ............................... 8101156

[51] Int. Cl.³ ............................................... B66C 1/46
[52] U.S. Cl. ................................. 294/87 R; 294/99 R
[58] Field of Search ................... 294/64 R, 65, 63 A, 294/67 BA, 86 R, 87 R, 90, 99 R

[56] References Cited

U.S. PATENT DOCUMENTS 2,929,653 3/1960 Hund et al. ....................... 294/90 X
3,178,217 4/1965 Bargel ............................... 294/90 X

FOREIGN PATENT DOCUMENTS 1001327 8/1965 United Kingdom ............. 294/99 R

Primary Examiner—Johnny D. Cherry
Attorney, Agent, or Firm—Sughrue, Mion, Zinn, Macpeak and Seas

[57] ABSTRACT

A bottle-gripping device for bottle-handling machines, comprising an outer housing part (5) and a muff (10) of elastic material arranged in the housing part. The muff is encircled by an outer support sleeve (9) and is arranged to be deformed when air under pressure is introduced between the support sleeve and the muff, into gripping engagement with the head of a bottle inserted in the muff. In order, among other things, to prevent interruptions is operation as a result of blocking the muff, and in order to reduce requirements on height adjustments, the muff (10) and the support sleeve (9) are arranged in a through-passing channel in the housing part (5). A bottle handling device incorporating such bottle-gripping devices is also described.

6 Claims, 12 Drawing Figures

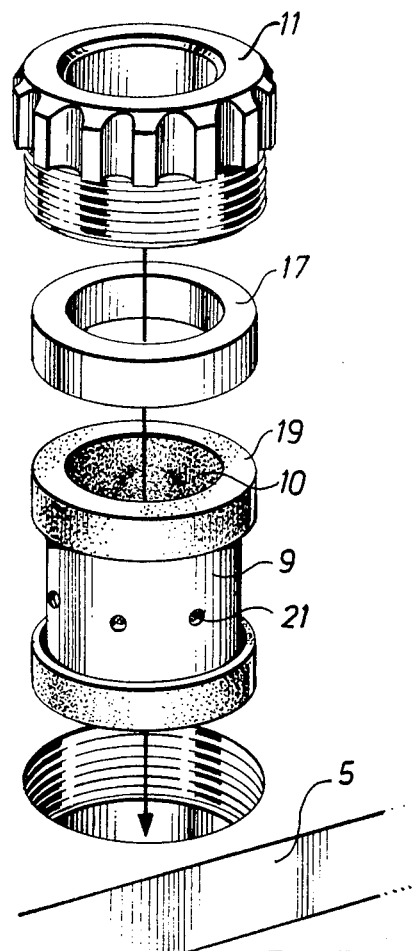
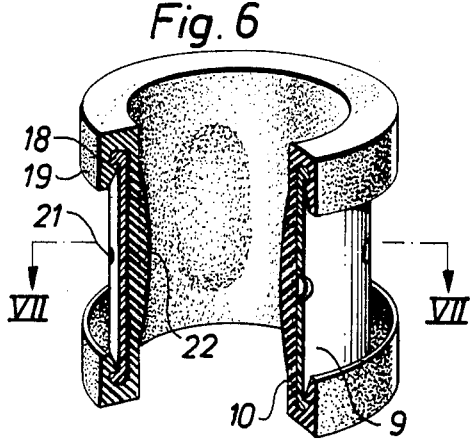
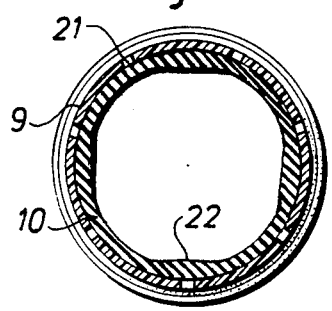
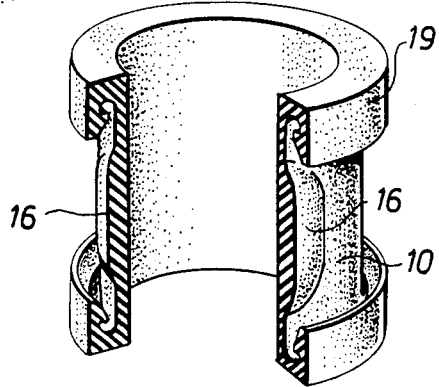
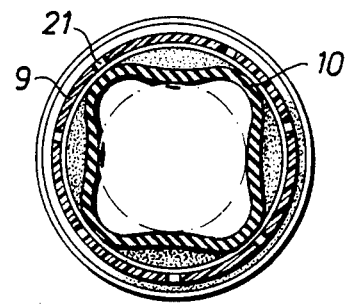

BOTTLE-GRIPPING DEVICE

The present invention relates to a bottle-gripping device for bottle-handling machines, said device comprising an outer housing part and a muff of elastic material arranged in said housing part, said muff being encircled by an outer support sleeve and arranged to deform, when air under pressure is introduced between the support sleeve and said muff, into gripping engagement with the head of a bottle inserted in the muff.

Such bottle-gripping devices may, for example, be incorporated in machines for lifting return bottles from crates arriving at a brewery, and for placing filled bottles into crates to be distributed from a brewery. Normally, a plurality of bottle-gripping devices, corresponding in number to the number of bottles in a crate, are coupled together to form a co-acting unit.

Such bottle-gripping devices, in which the part co-acting with the bottle comprises an elastic muff, suitably a rubber muff, afford considerable advantages over the more generally used bottle-gripping devices in which the bottle is gripped by means of balls or like elements which are urged into engagement with the bottle head. Among other things, the use of balls or other mechanical elements arranged to be pressed out through openings in an otherwise smooth cylinder wall creates a risk of operational disturbances as a result of scrap material, for example foil residues from return bottles, being pressed into the openings through which the balls are intended to emerge, preventing radial movement of said balls. Moreover, when bottles encapsulated with foil are gripped and lifted by such devices there is a serious risk of the foil being torn.

One of the disadvantages with present day lifting devices using rubber muffs is that the muffs have the form of hoods with the upper end surfaces closed, see for example the Swedish Patent Specification No. 332 385 and the British Patent Specification No. 710.775. Bottles are often returned with loosely fitted caps, lock rings or like elements, which readily fasten in the aforementioned hoods and block the same, making it difficult to remove said hoods. Further, the efficiency of such gripping devices is greatly dependent on a unitary bottle length, such that, for example, when a crate contains a bottle which is longer than the others the longer bottle can prevent the remaining bottles from being gripped. Consequently precise height adjustments must be made when passing from one bottle length to another.

Moreover, the rubber muffs of gripping devices of this known kind, see for example the aforementioned patent specifications, are not satisfactorily anchored in the hoods, since the muffs are simply pressed between two surfaces which press against each other. After using such a device for a short period of time, or when applying a strong pressure impulse, the rubber tends to creep out from between said surfaces with such an attachment arrangement.

In accordance with the present invention, the first mentioned disadvantage is eliminated by arranging the muff and the support sleeve in a through-passing channel in the housing part. Consequently, if, for example, a bottle cap or like element fastens in the lifting device, the cap or like element will be displaced by the next bottle over which the lifting device is lowered. Thus, the lifting device is automatically freed of any object fastening therein. In addition, if, in spite of everything, the device is blocked by some foreign element, said element can be readily removed manually through the channel.

In order to eliminate the risk of the rubber muff loosening during operation, the ends of the support sleeve in the lifting device according to the invention are provided with radially, outwardly extended flanges, and the muff is provided with end parts arranged to be drawn over said flanges and to be locked between the flanges and the inner wall of the through-passing channel. Because of a gap of limited width obtained between said flange and the inner wall of the channel, the rubber material which is gathered in this way on the rear side of said flanges is prevented from being drawn back over the flange.

Preferably, the aforementioned end parts of the muff are arranged to seal against the wall of the channel when the space defined by said wall, the support sleeve and the end parts of the muff is placed under pressure, and the support sleeve is provided with radial holes. The end parts of the muff arranged to be drawn over the end flanges of the support sleeve are also suitably provided with a surface which is acted upon by the pressure in said space in a manner to improve the seal between the end parts of the muff and the channel wall with increasing pressure in said space.

The hood-like muff according to the aforementioned Swedish Patent Specification No. 332 385 is provided with wart-like promontories, in order to obtain uniform deformation of the muff when subjected to an outer overpressure. Because of the presence of these wart-like raised portions, however, it is the portions of the muff lying between said raised portions which are pressed inwardly by said overpressure and which engage the bottle. This means that the greatest wear on the rubber muff is where the wall thickness is smallest, which limits the useful life of the muff.

This disadvantage is eliminated according to the invention by causing thickened portions of the muff to engage the bottle. This is achieved by providing the muff with external raised portions which abut the surrounding support sleeve and provide a certain degree of predeformation of the muff. When the overpressure is applied between the support sleeve and the muff, it is found that the overpressure magnifies the deforming effect obtained as a result of the abutment of the thickened portions against the support sleeve. Thus, the muff bulges inwardly at those locations provided with said raised portions and thus are of greater wall thickness than the intermediate portions, which are not deformed. The useful life of the rubber muff is substantially lengthened in this way.

Preferably a plurality of bottle-gripping devices, the number of said devices corresponding to the number of bottles in a crate, are arranged in a matrix array with the same mutual distance between the devices in two directions extending at right angles to each other. This enables all gripping devices to be arranged in a common block suspended from a holder means. Alternatively, the gripping devices can be arranged in blocks located in side-by-side relationship. The blocks are arranged for limited displacement from each other, and each block accommodates a row of gripping devices. The distance between the gripping devices extending in one of said directions can be made temporarily greater than the distance between the devices extending in the other of said directions. Among other things, this enables the distance between the gripping devices to be adjusted so as to suit the mutual spacing of bottles, which contact each other in a crate, and to suit the mutual spacing of bottles on a conveyor belt, where the rows of bottles are separated by plates. The aforementioned blocks are suitably displaceable on guides suspended from a holding means.

In all cases the muffs together with associated support sleeves are preferably moved downwardly from above in through-passing channels in said blocks, which greatly facilitates assembly work, repair operations and the exchange of gripping devices.

The invention will now be described in more detail with reference to the accompanying drawings.

FIG. 4 is an exploded view of a gripping device according to FIG. 2, showing said device withdrawn from an associated channel in the holder block.

FIG. 5 is a cut-away perspective view of the elastic muff of the gripping device illustrated in FIG. 4.

FIG. 6 is a view corresponding to FIG. 5, the muff being shown mounted on the support sleeve.

FIG. 7 is a horizontal sectional view of the gripping device illustrated in FIG. 6, taken on the line VII—VII, said device being shown in its rest position.

FIG. 8 is a sectional view corresponding to FIG. 7, showing the gripping device in an activated state.

Figure 1:
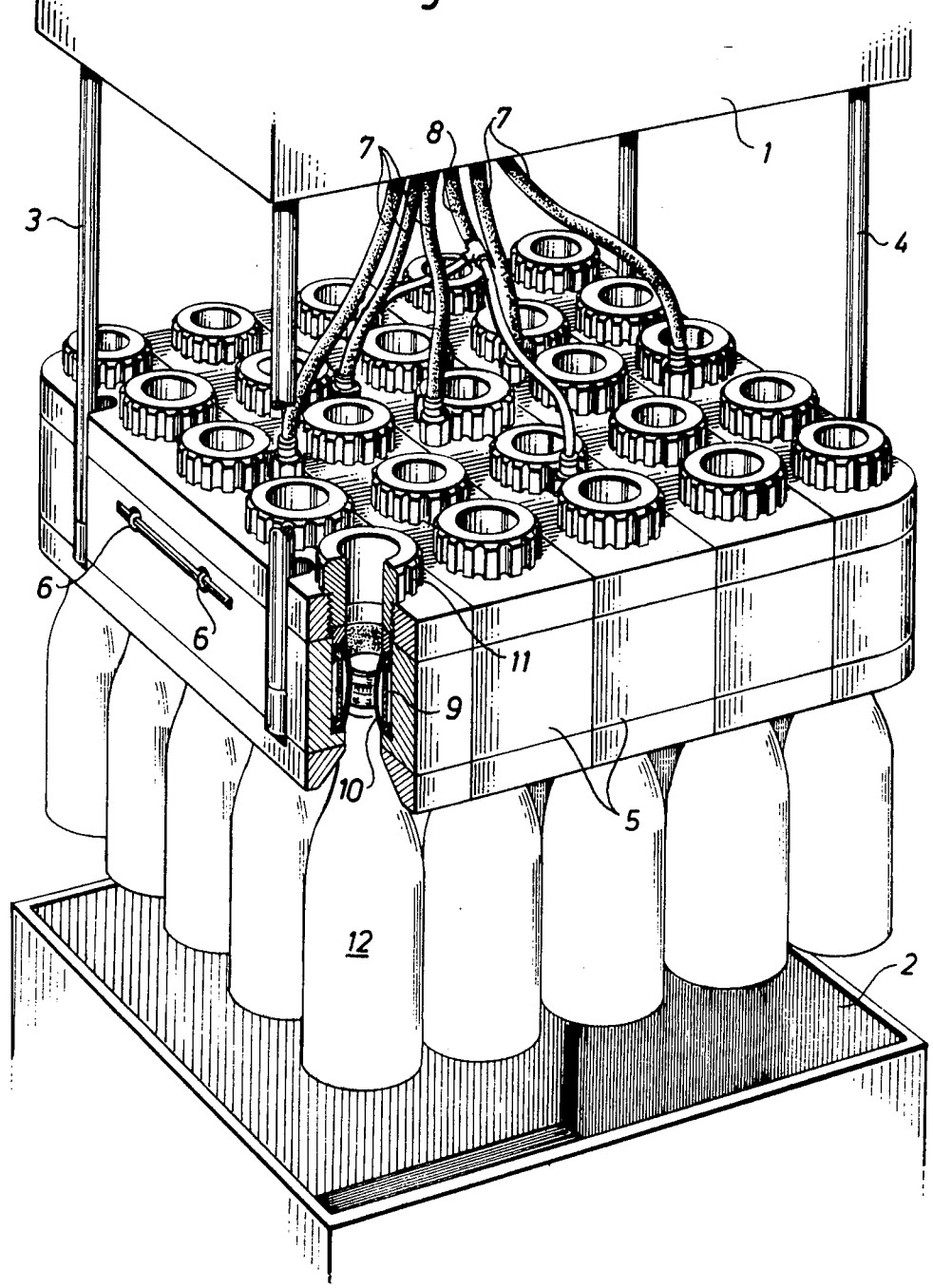
FIG. 1 is a perspective view of part of a bottle-handling machine provided with bottle-gripping devices according to the invention.
Figure 10:
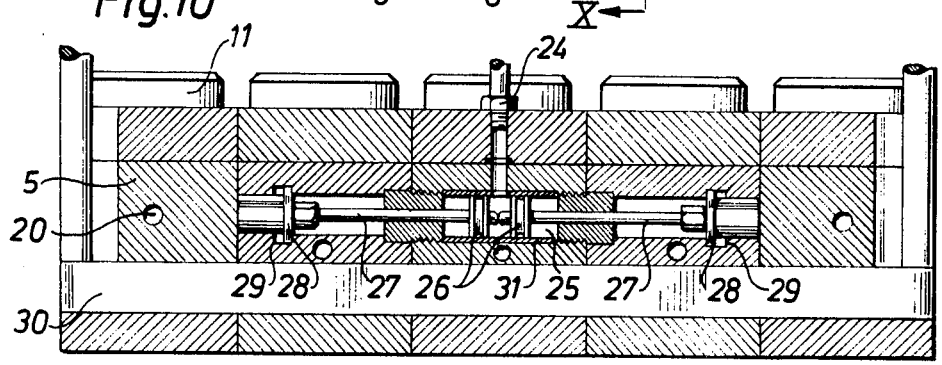
FIG. 10 is a sectional view taken on the line X—X in FIG. 9, showing the apparatus in a normal position.
Figure 11:
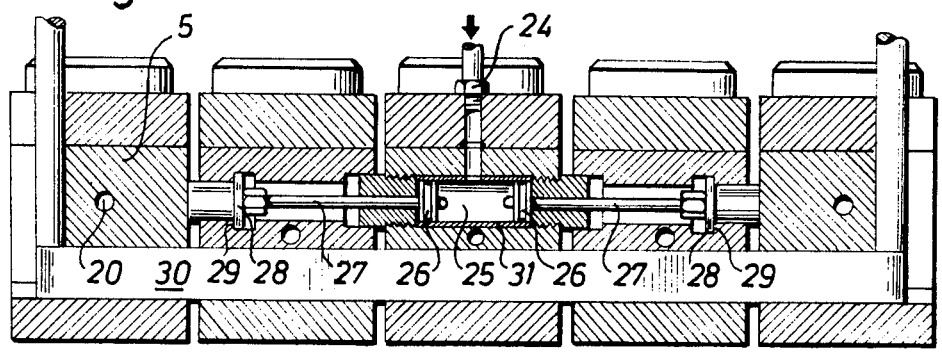
FIG. 11 is a sectional view corresponding to FIG. 10, in which the blocks are shown to be spaced apart.

Illustrated in FIG. 1 is a holding device 1 (not shown in detail) for bottle-gripping devices according to the invention. The holder can be raised and lowered, and moved laterally in order to enable bottles 12 to be lifted from a crate 2 and placed on a conveyor belt, and to enable bottles to be lifted from said conveyor belt. The holder 1 may be of known design, and has not therefore been shown in detail. The holder carries, via uprights 3 and 4, a plurality of blocks 5 arranged in side-by-side relationship, each of the illustrated blocks being provided with five through-passing channels or passages for accommodating associated gripping devices according to the invention. The blocks 5 are arranged for limited movement relative to one another on guides, as described hereinafter with reference to FIGS. 9–11. When occupying a normal position, the blocks 5 are held pressed against the centremost block, which is fixed to said guides, by means of springs 6 passing through the blocks. Each block is connected to a compressed-air line 7. The compressed-air lines 7 communicate with internal passages in respective blocks connecting said lines to each associated gripping device. Connected to the centre-most block are compressed-air lines 8, which are connected to two air cylinders used to effect limited lateral movement of the blocks 5 relatively to one another.

As illustrated schematically in FIG. 1, each gripping device has a rubber muff 10 mounted on a support sleeve 9, said muff being inserted into a through-passing channel in respective blocks 5. The gripping device is held in position by means of an upper, screw-threaded plug 11 provided with a through-passing hole. In the embodiment according to FIG. 1, the blocks 5 together accommodate 5×5 gripping devices, which corresponds to the number of bottles in the crate 2. It will be understood, however, that the number of gripping devices provided may correspond to any desired number of bottles whatsoever.

The design and function of the gripping device will now be described in more detail with reference to FIGS. 2–8. As will be seen from FIG. 2 and FIG. 3, each gripping device is arranged in a through-passing channel in a block 5, the lower part of which has a portion 14 which incorporates a conical guide opening 13. Arranged on the portion 14 is a low-friction intermediate ring 15. As will best be seen from FIG. 4, the gripping device is inserted downwardly into the channel in the block 5 until the device rests on said ring 15. The gripping device is held in position by means of the upper, screw-threaded plug 11, which exerts a given pressure against the rubber muff 10 of the gripping device via an upper intermediate ring 17. As before mentioned, the plug 11 is also provided with a through-passing channel.

In the illustrated construction having a completely through-passing channel, the gripping device will automatically clear the channel of any residual matter removed from a bottle when gripping the next one. Should the residual matter be firmly stuck in the channel, however, it is comparatively simple to remove said matter manually through the channel without removing the gripping device. The illustrated embodiment also enables one and the same gripping device to be used for bottles with slightly varying lengths. Consequently, the height to which the apparatus is adjusted is not critical.

As mentioned in the aforegoing, the actual gripping device comprises a cylindrical rubber muff 10 mounted on an outer support sleeve 9. As will best be seen from FIG. 6, the ends of the support sleeve 9 are provided with outwardly projecting flanges 18, and the rubber muff 10 is provided with end parts 19 projecting beyond the plane of the main body of the muff, said parts being arranged to be drawn over said flanges. In so doing, the flanges 18 are accommodated in grooves arranged in said end parts. The end parts 19 fit precisely in the through-passing channel in the block 5, such that when the gripping device is inserted into the channel there is formed a closed space between the inner wall of said channel, the support sleeve 9 and the end parts 19 of the rubber muff, which space can be placed under pressure via an air passage 20 in the block 5. The overpressure will act upon and deform the inwardly lying rubber muff 10, via holes 21 in the support sleeve 9.

The illustrated anchorage of the rubber muff is very safe, since the gathering of rubber obtained on the rear side of each flange 18 cannot be drawn past the flange when the gripping device is placed in its associated channel, due to the limited gap obtained between respective flanges 18 and the associated channel wall. Further, that portion of the end parts 19 of the muff 10 facing the space which is placed under pressure via the line 20 is so constructed that the overpressure in said space causes the end part 19 to be pressed against the channel wall with a force which increases with increasing pressure in said space, said portion of said end parts 19 of the illustrated embodiment being provided with an oblique surface. Thus, practical tests have shown that a gripping device is automatically held firmly in the channel in block 5, without using the upper screw plug 11. Consequently, the use of such a plug can be viewed simply as a pure safety measure. The plugs 11 need not therefore be tightened excessively, which simplifies the exchange of gripping devices. The aforementioned tests have also shown that a rubber muff anchored in the illustrated fashion has no tendency to loosen, even when placed under very high pressures.

Figure 2:
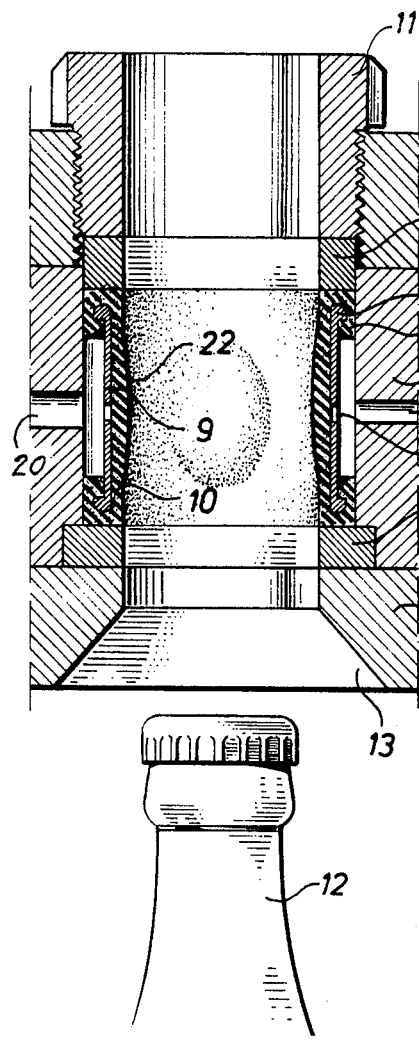
FIG. 2 is a vertical sectional view of a gripping device according to the invention incorporated in a machine of the kind illustrated in FIG. 1, said gripping device being shown in an inoperative rest position.
Figure 3:
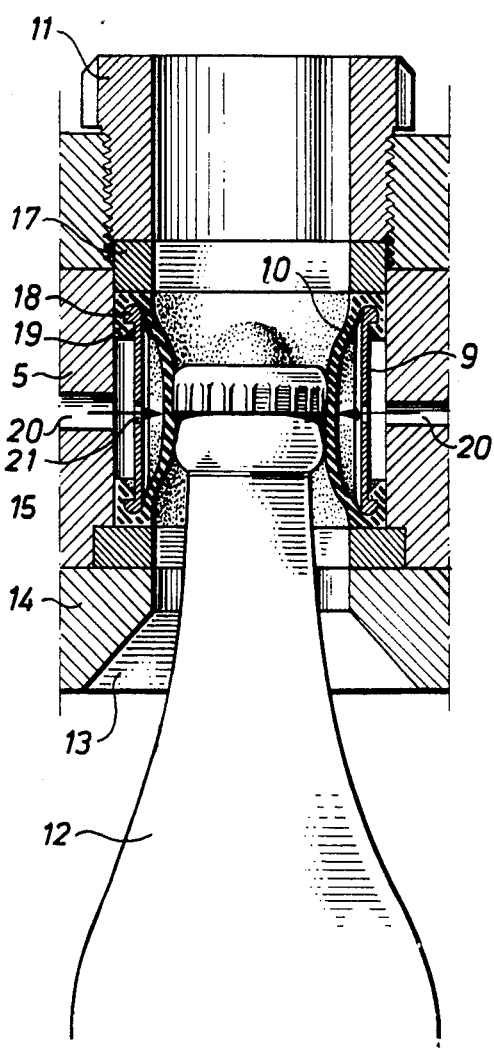
FIG. 3 is a sectional view corresponding to FIG. 2, showing the gripping device in an operative, working position.

In FIG. 2 the gripping device is shown in its rest position, i.e. before it is lowered down over the neck of a bottle 12, while FIG. 3 illustrates the gripping device in its operative, active position. In this latter position, compressed air has been passed through the passage 20 to the space between the block 5, the support sleeve 9 and the end parts 19 of the muff 10. The aforesaid overpressure acts upon the inwardly lying rubber muff 10, via holes 21 in support sleeve 9, causing the muff to be deformed and pressed into abutment against the bottle neck or head. Horizontal sectional views of the gripping device corresponding to FIGS. 2 and 3 and taken on the line VII—VII in FIG. 6 are shown in FIGS. 7 and 8 respectively.

For the purpose of increasing the useful life time of the rubber muff 10, said muff is provided with external thickened portion 16, as illustrated in FIG. 5. When these thickened portions lie against the surrounding support sleeve 9, see FIGS. 2, 6 and 7, the rubber muff 10 is deformed to some extent, resulting in inwardly bulging muff portions 22. When the rubber muff is subsequently subjected to an overpressure, through holes 21, the deformations 22 on the rubber muff, obtained as a result of the abutment of the thickened portions 16 against the support sleeve 9, will be amplified and result in inwardly projecting folds in the regions of said thickened portions, see FIG. 8. Thus, it is these folds which are brought into gripping engagement with the bottle neck, the greatest wear on the muff occurring within the regions where the wall thickness is greatest, thereby greatly extending the useful life of the muff.

As will be readily understood, the provision of a rubber muff with thickened portions which when co-acting with the support sleeve cause the muff to be deformed can also be applied with muffs which are not in the form of a sleeve, for example muffs of the previously known hood form or the like. This also applies to the described manner of anchoring the muffs. In this respect, a hood-shaped muff is only anchored at its lower, open ends.

Figure 9:
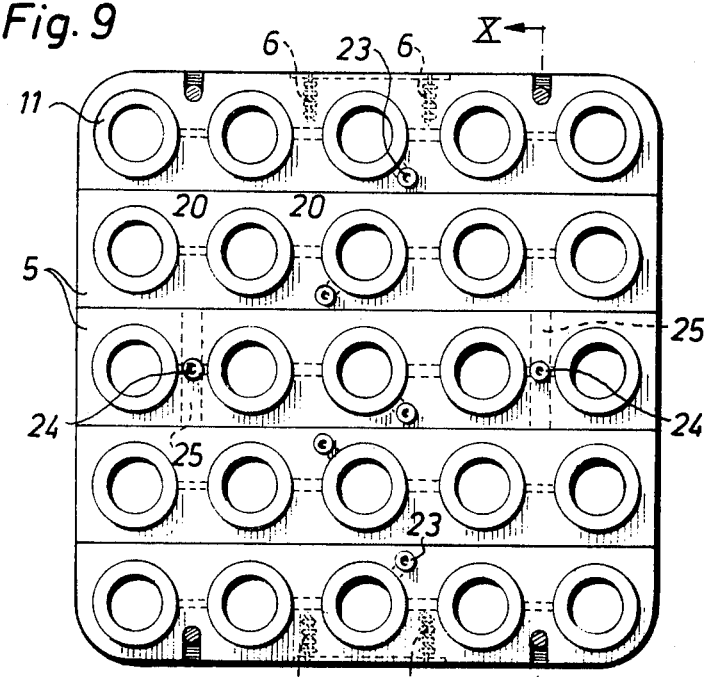
FIG. 9 is a schematic plan view of the apparatus illustrated in FIG. 1, with the supply lines disconnected.

FIG. 9 is a top plan schematic of the apparatus illustrated in FIG. 1, the reference 23 identifying connections for the air hoses 7. Thus, each block 5 is provided with a separate connection, which communicates with one of the channels in the block 5 intended to receive the gripping devices. Thus, the channels accommodating the gripping devices are mutually connected together by means of air passages 20. As before mentioned with reference to FIG. 1, springs 6 are provided for holding all of said blocks 5 together to form a unit. Only parts of the springs 6 have been shown. In practice, however, the springs pass through all blocks 5.

The reference 24 identifies two connections for the air lines 8, which pass air to two air cylinders 25 arranged in the centremost block 5, for mutual displacement of the blocks 5 on guides 30. As will best be seen from FIGS. 10 and 11, each air cylinder 25 is provided with two pistons 26 which are displaceable in different directions and which are in direct connection with the outer blocks 5 via piston rods 27. The piston rods 27 are provided at their outer ends with fixed flanges 28 which co-act with a corresponding, respective shoulder 29 on the next outermost blocks 5, the arrangement being such that when the outer blocks 5 are displaced to a given extent said next outermost blocks 5 are caused to accompany movement of the piston rods. Thus, when the cylinders 25 are placed under pressure firstly the outermost blocks 5 are moved, whereafter the next outermost blocks are caused to accompany the movement of said outermost blocks. The arrangement is suitably such that the final spacing between the blocks is the same for all blocks, this state being illustrated in FIG. 11. As will be understood, displacement of the blocks may be effected by means other than those illustrated.

The aforedescribed embodiment is particularly suitable for picking-up bottles from a conveyor belt on which the bottles are separated by plates and which bottles are then to be placed side by side in crates in contact with one another. Thus, when gripping bottles on a conveyor belt the cylinders 25 are placed under pressure, to separate the individual blocks 5, each of which contains a row of bottle gripping devices. When placing the bottles in the crate, the cylinders 25 are evacuated, whereupon the springs 6 draw the blocks together so that the mutual distances between the bottles is the same in two directions extending at right angles to one another.

The blocks 5 are suitably made from a high-grade plastics material, which enables, for example, the cylinders 25 to be formed directly in the centremost block 5. In this case, the cylinders 25 are provided with a replaceable lining made of the same plastics material as the block and referenced 31 in the figures.

The aforedescribed arrangement of a plurality of gripping devices located in blocks arranged for limited movement relative to one another affords considerable advantages over previously known arrangements in which each individual gripping device is normally suspended for movement in a holder means. Compared with previously known apparatus, the apparatus according to the invention affords the important advantage whereby the gripping devices can be assembled and disassembled from the upper surface of the apparatus in a simple fashion without the use of tools, since it is not necessary to tighten the plugs 11. Thus, each separate gripping device can be removed and replaced without needing to dismantle the air lines and the like.

As will be understood, if it is not necessary to arrange the blocks for movement relative to one another, the gripping devices may be arranged in a single fixed block. In this case, only one compressed-air line is required. This air line may be incorporated in one of the uprights.

Figure 12:
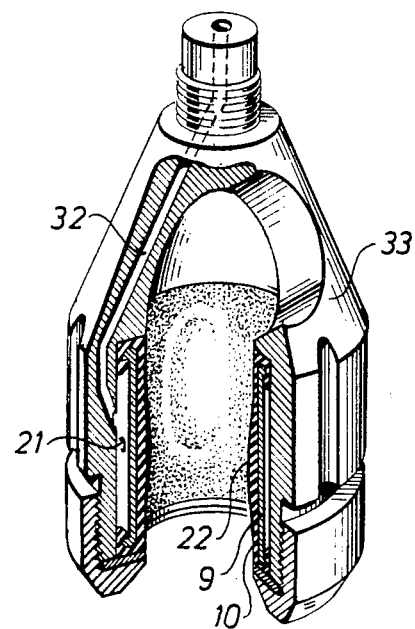
FIG. 12 is a partially cut-away perspective view of a gripping device according to the invention in the form of a separate unit.

FIG. 12 illustrates a gripping device according to the invention in the form of a separate unit, said gripping device, with respect to the design of the rubber muff 10 and the anchoring of said muff with the aid of the support sleeve 9, coincides in principle with the previously illustrated, highly advantageous embodiment of the muff. The muff illustrated in FIG. 12 also has a through-passing channel, to enable automatic clearing of lodging elements. For construction reasons, the upper part of the channel is angled. This gripping device is intended to be suspended from a holder arm, which is suitably pivotable and which is provided with an air passage communicating with the air passage 32 in the housing part 33. The mode of operation is the same as that earlier described, and hence no further description is necessary.

The aforedescribed embodiments are only preferred examples of the invention, and can be modified in several respects within the scope of the claims, among other things with respect to the arrangement of compressed-air lines and the construction and assembly of the blocks. As will be understood, other pressure mediums than compressed air may be used. Further, the thickened part of the rubber muff may be varied with respect to shape and number. These thickened portions, for example, may have the form of elongate ridges whose height increases towards the centre thereof, in addition to the illustrated wart-like portions.

I claim:

1. A gripping device of the kind including a support sleeve (9) having radially projecting flanges (18) and a substantially cylindrical muff (10) of elastic material mounted on said flanges, and air passages (20; 21; 32) for supplying pressurized air to the space between the muff (10) and the support sleeve (9) for deformation of the muff, characterized in that the end portions (19) of the muff (10) are so designed that when mounting the muff on said support sleeve (9) said end portions are drawn over the flanges (18) of the sleeve to surround the flanges, that the support sleeve with the muff mounted thereon is arranged to be carried by a holder means (5; 33) so designed that between the respective flange (18) of the sleeve and a continuous wall surface of the holder means (5; 33) there is obtained a passage having a width less than the thickness of the end portion (19) of the muff (10) located adjacent the underside of the flange (18), that said end portions each have a surface arranged to seal against said wall surface so that the end portions (19) together with the support sleeve (9) and said wall surface of the holder means (5; 33) define a confined space for connection to a compressed-air supply and communicating with the space between the muff (10) and the support sleeve (9) through openings (21) in the support sleeve, and in that each end portion (19) has a surface acted upon by the pressure in said confined space in a manner to improve the seal between the end portions and said wall surface when the pressure in said space increases, whereby the frictional force retaining the muff (10) in place increases as the pressure tending to displace the muff increases.

2. A gripping device according to claim 1, characterized in that the muff (10) is made of rubber and provided with raised portions (16) about its outer periphery which abut the support sleeve (9) and cause the muff (10) to be predeformed (22) to a given extent.

3. A bottle-handling device incorporating a plurality of gripping devices (9, 10) according to claims 1 or 2, characterized in that all gripping devices (9, 10) are arranged in through-passing channels in a common block of said holder means which channels are arranged in a matrix array with uniform spacing between the channels in two directions extending at right angles to one another.

4. A bottle-handling device incorporating a plurality of gripping devices (9, 10) according to claims 1 or 2, characterized in that all gripping devices (9, 10) are arranged in through-passing channels in a matrix array with uniform spacing between the channels in two directions extending at right angles to one another, said channels being located in blocks arranged in a side-by-side relationship, said blocks forming said holder means (5) and being arranged for limited movement away from each other, each of said blocks accommodating a row of gripping devices, whereby the mutual spacing between the gripping devices (9, 10) can be temporarily made somewhat greater in one of said directions than in the other.

5. A bottle-handling device according to claim 4, characterized in that said blocks of said holder means are arranged for movement on guides (30) suspended from a holder (1).

6. A bottle-handling device according to claim 5, characterized in that the muffs (10) with support sleeves (9) are insertable into the through-passing channels of said blocks from the top of the channels.

* * * * *